(12) United States Patent
Alanen et al.

(10) Patent No.: US 9,277,346 B2
(45) Date of Patent: Mar. 1, 2016

(54) TERMINATION OF SERVICE PERIOD IN WIRELESS NETWORK

(71) Applicant: Nokia Corporation, Espoo (FI)

(72) Inventors: Olli Petteri Alanen, Vantaa (FI); Jarkko Lauri Sakari Kneckt, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/304,839

(22) Filed: Jun. 13, 2014

(65) Prior Publication Data

US 2014/0378121 A1    Dec. 25, 2014

(30) Foreign Application Priority Data

Jun. 25, 2013 (FI) .................................... 20135689

(51) Int. Cl.
| | |
|---|---|
| *H04M 3/00* | (2006.01) |
| *H04W 4/00* | (2009.01) |
| *H04W 8/24* | (2009.01) |
| *H04M 1/725* | (2006.01) |

(52) U.S. Cl.
CPC ............ *H04W 4/00* (2013.01); *H04M 1/72533* (2013.01); *H04W 8/245* (2013.01); *H04W 8/24* (2013.01)

(58) Field of Classification Search
CPC ......... H04W 4/00; H04W 8/245; H04W 8/24; H04M 1/72533
USPC ............................... 455/420, 419, 418, 414.1
See application file for complete search history.

(56) References Cited

U.S. PATENT DOCUMENTS

| | | | |
|---|---|---|---|
| 2005/0136914 A1* | 6/2005 | van Kampen et al. | ..... 455/426.2 |
| 2005/0259679 A1 | 11/2005 | Chowdhury et al. | |
| 2007/0004374 A1* | 1/2007 | Kneckt ............. | H04L 29/06027 455/343.1 |
| 2007/0191052 A1* | 8/2007 | Kneckt ................ | H04W 52/04 455/522 |
| 2007/0281617 A1 | 12/2007 | Meylan et al. | |
| 2009/0097428 A1* | 4/2009 | Kneckt ............. | H04W 52/0216 370/311 |
| 2009/0097438 A1 | 4/2009 | Kneckt et al. | |
| 2010/0165896 A1* | 7/2010 | Gong ................ | H04W 52/0216 370/311 |
| 2013/0051293 A1 | 2/2013 | Wentink et al. | |
| 2014/0204821 A1* | 7/2014 | Seok ................. | H04W 52/0206 370/311 |
| 2014/0321350 A1* | 10/2014 | Kneckt ............... | H04W 76/048 370/311 |

FOREIGN PATENT DOCUMENTS

| | | |
|---|---|---|
| EP | 2574113 A2 | 3/2013 |
| WO | WO-2007085948 A2 | 8/2007 |
| WO | WO-2013008989 A1 | 1/2013 |

OTHER PUBLICATIONS

Search Report dated Mar. 4, 2014, issued by the Finnish Patent and Registration Office for Finnish application No. FI 20135689.

* cited by examiner

*Primary Examiner* — Khai M Nguyen
(74) *Attorney, Agent, or Firm* — Mintz Levin Cohn Ferris Glovsky and Popeo, P.C.

(57) ABSTRACT

This document discloses methods, apparatuses, and computer programs for operating a wireless apparatus during a service period between two wireless apparatuses. The service period comprises a first period during which only one of the apparatuses may terminate the service period and another period during which the other apparatus may terminate the service period.

23 Claims, 4 Drawing Sheets

TERMINATION OF SERVICE PERIOD IN WIRELESS NETWORK

CROSS-REFERENCE TO RELATED APPLICATION

This application claims priority to Finnish patent application no. FI 20135689, filed on Jun. 25, 2013, the contents of which are incorporated herein by reference in their entirety for all purposes.

FIELD

The invention relates to the field of wireless communication networks.

BACKGROUND

A wireless communication network may employ service periods to transfer data between wireless apparatuses of the network. Duration of a service period between the wireless apparatuses may be limited.

BRIEF DESCRIPTION

The invention is defined by the independent claims.

Embodiments of the invention are defined in the dependent claims.

LIST OF DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
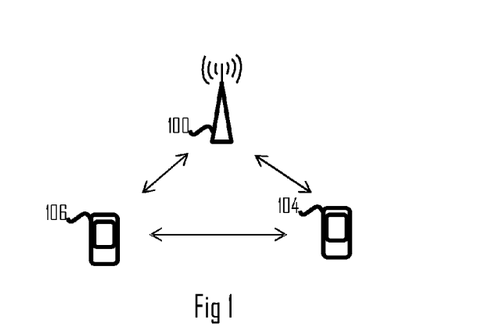
FIG. 1 illustrates a wireless communication scenario to which embodiments of the invention may be applied.

A general wireless communication scenario to which embodiments of the invention may be applied is illustrated in FIG. 1. FIG. 1 illustrates wireless communication devices comprising an access point (AP) 100 and a plurality of terminal devices (STA) 104, 106. The AP 100 may be stationary access point. A general term used in this specification and encompassing both the APs and STAB is a wireless apparatus. The access point may refer to an access point specified in IEEE 802.11 specifications or to a base station of another wireless access network. At least one of the terminal devices 104, 106 may have a functionality of an AP as well. Therefore, a common term encompassing both the stationary APs 100 and mobile APs 104, 106 is an access node. An access node may provide or be comprised in a basic service set (BSS) which is a basic building block of an IEEE 802.11 wireless local area network (WLAN). Each access node may represent a different BSS. The most common BSS type is an infrastructure BSS that includes a single access node together with all STAs associated with the AP. The access node may provide access to other networks, e.g. the Internet. In another embodiment, the BSSs may be connected with each other by a distribution system (DS) to form an extended service set (ESS). An independent BSS (IBSS) is formed by an ad hoc network of terminal devices without a stationary controlling access point. While embodiments of the invention are described in the context of the above-described topologies of IEEE 802.11, it should be appreciated that these or other embodiments of the invention may be applicable to networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups, e.g. 802.19 task group 1 (TG1).

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP.

As described above, the BSS may be represented by the access node 100 and one or more terminal devices 104, 106 connected to the access node 100. A terminal device may establish a connection with any one of the access nodes it has detected to provide a wireless connection within the neighbourhood of the terminal device. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

IEEE 802.11ai task group is creating principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks.

Embodiments of the invention may be applicable to all communication scenarios described above, e.g. communicating parties comprise an access node and a terminal device or two terminal devices communicating directly with each other without the access node. The embodiments may employ service periods in which data may be transferred between the communicating parties. The use of the service period may be linked to a power-save mode of at least one of the communicating parties. An example of the use of the power-save mode is the automatic power-save delivery (APSD) of the 802.11 networks. The access node or, in general, a serving apparatus providing and controlling the service periods may transmit traffic indication maps (TIM) in beacon frames, for example. The traffic indication map comprises information indicating whether or not the serving apparatus has stored data to be transmitted to one or more client apparatuses. The terminal device or, in general, a client apparatus may use the power-save mode to save battery power and wake up from the power-save to receive the TIM and determine whether or not the serving apparatus has data for the client apparatus. If the client apparatus detects the presence of data in the serving apparatus, the client apparatus may transmit a trigger frame to the serving apparatus. The trigger frame may trigger the start of a service period in which the serving apparatus may transmit the buffered data to the client apparatus. It should be appreciated that the service period may be triggered by other mechanisms as well. The duration of the service period may be determined in the establishment of the service period, and the serving apparatus may indicate the duration in a frame that it transmits to announce the start of the service period.

Figure 2A:
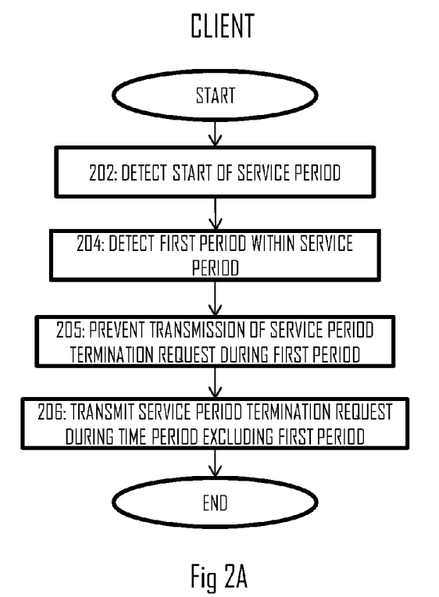
FIGS. 2A and 2B illustrate flow diagrams of embodiments for termination of a service period in a wireless network according to an embodiment of the invention.
Figure 2B:
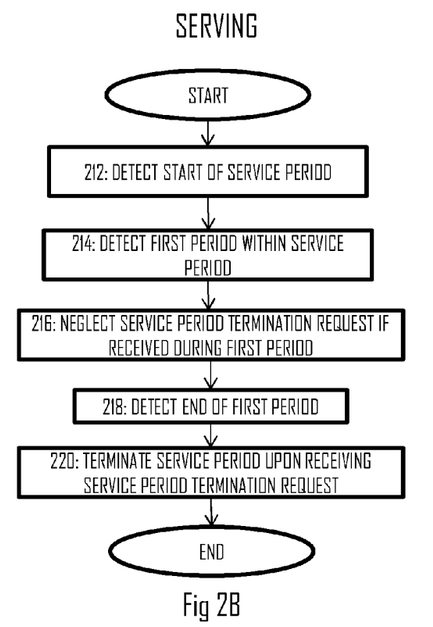

FIGS. 2A and 2B illustrate flow diagrams of processes for providing a mechanism to end a service period. FIG. 2A illustrates a process carried out in the client apparatus, e.g. the above-described terminal device, and FIG. 2B illustrates a process carried out in the serving apparatus, e.g. a terminal device or an access node. The serving apparatus may be a logical "owner" of the service period, e.g. the channel(s) of the wireless network may be reserved for the serving apparatus for the duration of the service period.

Referring to FIG. 2A, the client apparatus detects a start of a service period between the client apparatus and the serving apparatus in block 202. In block 204, the client apparatus detects a first period within the service period. The first period refers to a time interval during which only the serving apparatus is able to terminate the service period. In block 206, the client apparatus causes transmission of a service period termination request to the serving apparatus during a time period excluding said first period.

In an embodiment, the client apparatus prevents transmission of the service period termination request during the first period (block 205).

Referring to FIG. 2B, the serving apparatus detects the start of the service period between the serving apparatus and the client apparatus in block 212. In block 214, the serving apparatus detects the first period within the service period, wherein only the serving apparatus is able to terminate the service period during the first period. Upon receiving a service period termination request received from the client apparatus during the first period within the service period, the serving apparatus neglects such a request (block 216). However, a service period termination request received outside the first period and within the service period causes the serving apparatus to start termination of the service period before the intended termination of the service period. Blocks 218 and 220 of FIG. 2 illustrate this embodiment where the serving apparatus detects the end of the first period (block 218) and, upon receiving a service period termination request after block 218, terminates the service period as a response to the received service period termination request.

In another embodiment, the serving apparatus does not discard the service period termination request received during the first period but stores the request and performs the responsive action when the first period has expired. Accordingly, the serving apparatus may store service period termination requests received during the first period and delay any responsive termination of the service period at least until the first period has expired. This embodiment enables the client apparatus to transmit the service period termination request at any time during the service period and the access node performs the responsive action by terminating the service period only during the time period when the client-initiated service period termination is allowed.

Figure 3:
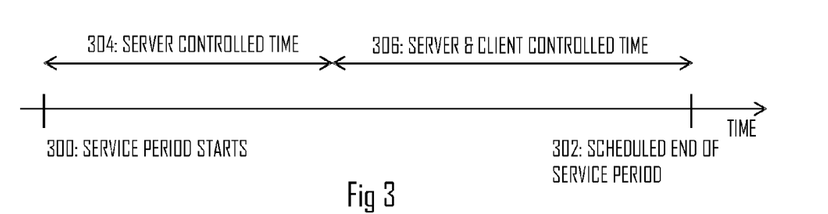
FIG. 3 illustrate a time division of the service period into at least two time period, each time period associated with different rules for service period termination according to an embodiment of the invention.

In the above-described embodiments, the service period is logically divided into at least two time intervals: at least one time interval where only the serving apparatus may cause ending of the service period; and at least one time interval where the client apparatus may cause the ending of the service period. FIG. 3 illustrates an embodiment of these two time intervals. The time interval 304 where only the serving apparatus may cause the ending of the service period may start from the start of the service period 300, last for a determined duration, and end before the scheduled end 302 of the service period. The time interval 304 may be considered as the above-described first period. The time interval 306 where the client apparatus may cause the ending of the service period may start when the time interval 304 ends and last to the scheduled end 302 of the service period. The mutual portions of the (at least) two time intervals may be chosen according to a system design, e.g. they may have equal lengths. In some embodiments, the order of the time intervals may be reversed or the service period may comprise a plurality of one or both types of intervals 304, 306.

This multi-interval arrangement enables the client apparatus to terminate overly long service periods. It also ensures that the serving apparatus does not start the service period for naught and that it may carry out frame transmissions at least for a certain duration from the start of the service period. It also avoids frequent immediate service period terminations caused by the client device. Provision of the time interval 306 where the client apparatus and, optionally the serving apparatus, enables release of the channel resources for other use in case the client apparatus and/or the serving apparatus has/have no need for further frame transmissions. It also enables the client apparatus to perform other functions or tasks during the time period thus released, e.g. carry out scanning, search for another access node, etc. The client apparatus may request for the termination of the service period even if the serving apparatus had further frames to transmit during the service period. Upon receiving the service period termination request cancelling transmission of one or more frames, the serving apparatus may carry out the transmission of the one or more frames during the next service period.

Figure 4:
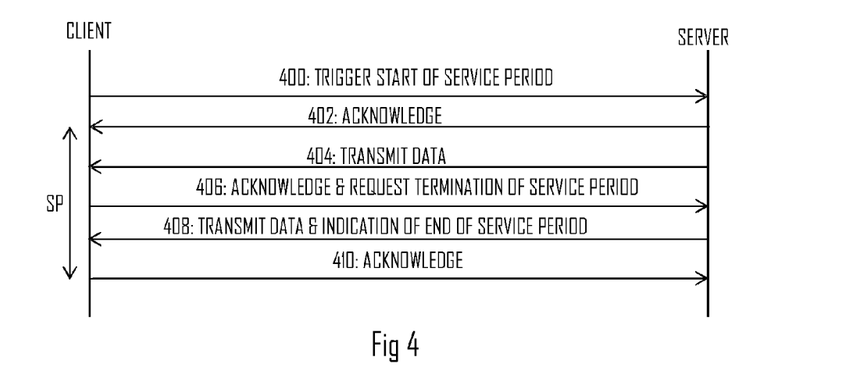
FIGS. 4 and 5 illustrate an embodiment where the service period termination is executed after at least one frame transmission after transmission of a service period termination request according to an embodiment of the invention.
Figure 5:
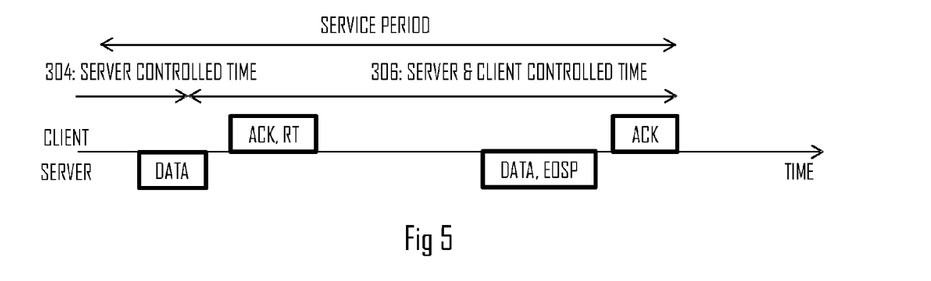

FIGS. 4 to 8 illustrate embodiments of signalling mechanisms used to cause the termination of the service period. FIGS. 4 and 5 illustrate an embodiment where the serving apparatus carries out one or more frame transmissions after receiving the request to terminate the service period. Referring to FIG. 4, the client apparatus requests the start of the service period in step 400 and, upon receiving the request and determining to start the service period, the serving apparatus acknowledges the request in step 402. Transmission of the acknowledgment (step 402) or the transmission of the triggering message (step 400) may effectively start the service period (SP). In step 404, the serving apparatus transmits a data frame and/or another frame to the client apparatus during the service period (data in FIG. 5). The client apparatus acknowledges the reception of the frame in step 406 and requests for the termination of the service period by inserting a corresponding information element into a frame carrying the acknowledgment (ACK, RT in FIG. 5). The information element may be inserted into a medium access control (MAC) header of the frame as a one-bit indicator, for example. Upon receiving the request in step 406, the serving apparatus may determine whether or not the request was received during the time interval when the client apparatus may trigger the termination of the service period. If the request was received during the time interval when the client apparatus may trigger the termination of the service period, the serving apparatus may start the termination of the service period. In this embodiment, the serving apparatus carries out one or more frame transmissions (step 408) and inserts an end of service period indicator into the last frame it transmits before the end of the service period (DATA, EOSP in FIG. 5). An acknowledgment (step 410 in FIG. 4 and ACK in FIG. 5) by the client apparatus to the reception of the last frame may be considered as an end time of the service period. In embodiments not employing the frame acknowledgments, the transmission of the last frame may be considered as an end time of the service period.

Figure 6:
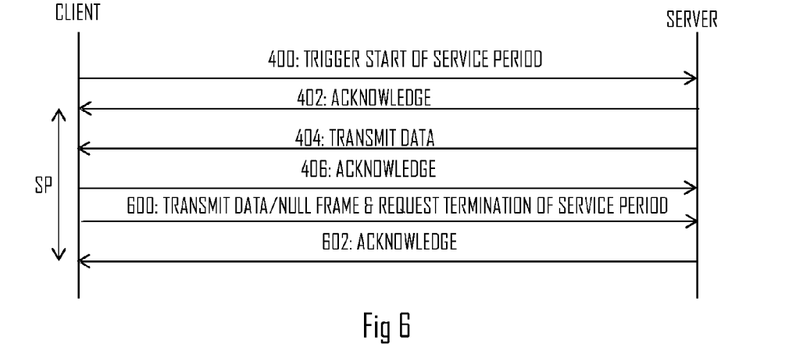
FIGS. 6 and 7 illustrate an embodiment of a fast termination of the service period where the service period termination request is comprised in an uplink data frame according to an embodiment of the invention.
Figure 7:
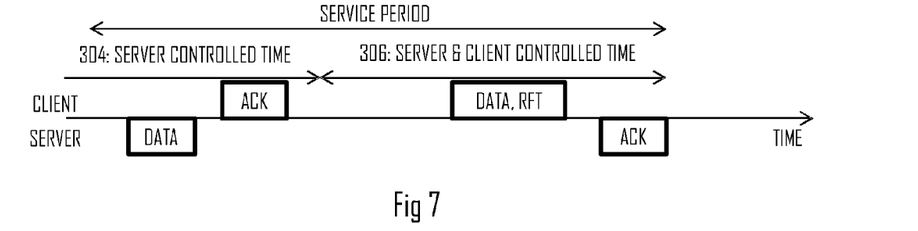

The service period may be used for unidirectional (downlink or uplink) frame transmissions or bidirectional (uplink and downlink) frame transmissions. FIGS. 6 and 7 illustrate an embodiment where the client apparatus inserts the request of the termination of the service period to a data frame. Steps 400 to 406 may correspond to the corresponding steps described above in connection with FIG. 4. In step 600, the client apparatus transmits a data frame to the serving apparatus during the service period, wherein the data frame comprises the request for the termination of the service period (DATA, RFT). In this embodiment, the request may cause immediate termination of the service period. Accordingly, the acknowledgment to the data frame transmitted by the serving apparatus in step 602 may end the service period. The serving apparatus may allow the terminations that are requested by the client apparatus during the time period where the client apparatuses may initiate the termination of the service period. Requests received during a time period when only the serving apparatus may terminate the service period may be neglected, as described above.

In another embodiment, a null frame comprising no payload may be transmitted in step 600 instead of the data frame comprising data as payload.

Figure 8:
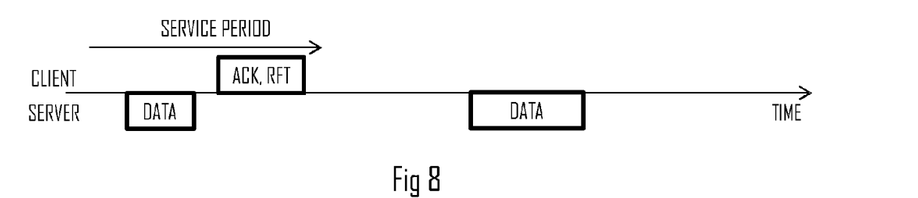
FIG. 8 illustrates another embodiment of the fast termination of the service period according to an embodiment of the invention.

FIG. 8 illustrates an embodiment that combines features from the embodiments of FIGS. 5 and 7. In the embodiment of FIG. 8, the client apparatus may send the request for the termination of the service period in the acknowledgment message, as in FIG. 5, and the request may cause the fast termination of the service period, as in FIG. 7. The serving apparatus may use thus released resources to transmit data to another client apparatus (DATA frame on the right hand side of FIG. 8).

As may be understood from the description of FIGS. 4 to 7, there may be two types of requests for the termination of the service period. One request may cause slow termination of the service period where the serving apparatus and/or even the client apparatus may transmit a data frame after the transmission/reception of the request. Another type of request may cause the fast termination, and the service period may end at the transmission/reception of the request or at the transmission/reception of the acknowledgment to the frame carrying the request. The wireless network comprising the serving apparatus and the client apparatus may use both of these logically different types of requests, e.g. the client apparatus may determine whether it requests for the fast or slow termination of the service period and then inserts a corresponding information element into the frame transmitted to the serving apparatus. Upon receiving the request comprising the request for the termination of the service period, the serving apparatus may determine which type of termination is requested by the client apparatus and carry out the termination in the corresponding manner.

When the frame received from the client apparatus comprises both requests, i.e. the request for the fast termination and slow termination of the service period, the request for the fast termination may overrule the request for the slow termination and the serving apparatus may operate according to the request for the fast termination of the service period.

In the embodiments using the fast termination of the service period, the serving apparatus may not be able to prevent the transmission of one or more data frames it already has prepared for the transmission. In such a case, the serving apparatus may carry out the frame transmission and carry out a retransmission in the subsequent service period.

As described above, the request for the termination of the service period may be included in a frame transmitted to the serving apparatus, wherein the frame has another, primary function. The primary function may be the transfer of data or an acknowledgment, as described above. The request for the termination of the service period may, however, be inserted into a separate action frame formed with the only purpose of sending the request.

Figure 9:
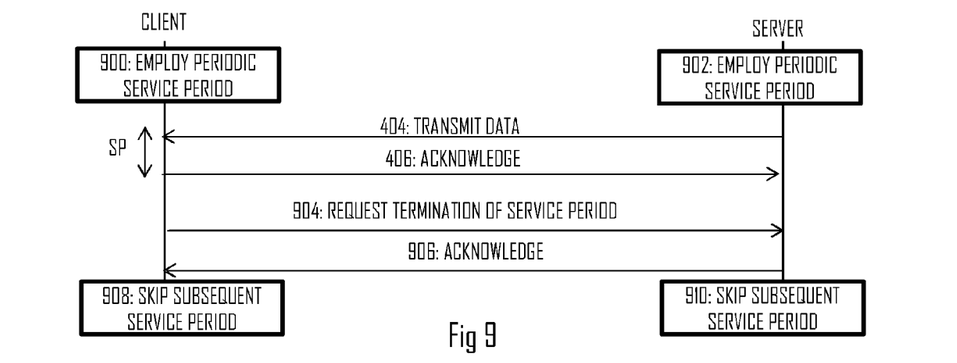
FIG. 9 illustrates an embodiment of cancellation of a future service period according to an embodiment of the invention.

In yet another embodiment, the client apparatus may request for the termination of the service period before the service period has started. In this embodiment, the client apparatus may transmit the request for the termination of the service during a time interval that excludes the service period, e.g. precedes the service period. FIG. 9 illustrates an embodiment where this embodiment is applied to a situation where the serving apparatus and the client apparatus employ period service periods (blocks 900, 902). Parameters of the service period, e.g. the periodicity of the service period, may be determined by the client apparatus. In some embodiments, the service periods may be aperiodic and the client apparatus may choose the timings of the service periods. Referring to FIG. 9, the serving apparatus may transmit data in step 404 during a service period, and the client apparatus may acknowledge the correct reception data in step 406, as described above. When the service period has ended and the next one has not yet started, the client apparatus may determine that it wants to skip the next service period. As a consequence, the client apparatus may transmit the request for the termination of the service period in step 904 between two consecutive service periods. In step 906, the serving apparatus acknowledges the reception of the frame carrying the request. In response to the request, both the client apparatus and the serving apparatus skip the subsequent service period and release the resources of the service period for other tasks (blocks 908, 910).

With respect to configuring the use of the client-initiated service period termination, the serving apparatus may indicate the availability of the client-initiated service period termination through a service period capability field comprised in a frame broadcasted by the serving apparatus. The service period capability field may be included in beacons, probe responses, and/or association messages transmitted by the serving apparatus. An example of the service period capability field is illustrated in Table 1:

TABLE 1

| Reserved | FT Supported | RT Supported | SA-Controlled Time |
| --- | --- | --- | --- |
| 1 bit | 1 bit | 1 bit | 5 bits |

When a Fast Termination (FT) Supported field may be set to a first value, the serving apparatus indicates that it is capable to provide the fast termination of the service period upon request. Otherwise, the field may be set to the other value. When the serving apparatus supports the fast termination and receives a frame with an FT field set to a first value from the client apparatus, the serving apparatus may carry out the fast termination of the service period in the above-described manner.

When a Request for Termination (RT) Supported field may be set to a first value, the serving apparatus indicates that it is capable to set a frame to transmission buffer that will terminate the service period when it receives a frame with an RT field set to a first value from the client apparatus. Otherwise, the RT Supported field may be set to the other value. Accordingly, this field may indicate whether or not the serving apparatus supports the slow termination of the service period.

A Serving Apparatus (SA) Controlled Time field may indicate the duration in which only the serving apparatus may terminate the service periods. The time may be counted from the start of each service period. The duration may be defined in determined time units, e.g. in milliseconds. A value 0 may indicate that the SA-controlled time not applied, and this may indicate that only the serving apparatus is able to terminate the service periods or that the client apparatus may terminate the service period at any time during the service period.

When the client apparatus transmits the service period capability field in an association frame, for example, the FT Supported and RT Supported fields may be used to indicate whether or not the client apparatus is capable of requesting the fast termination and/or the slow termination of the service period. The SA-Controlled Time field may be reserved in these frames.

The advanced termination of the service periods may be employed only in an associated or connected state between the client apparatus and the serving apparatus, provided that the feature is supported by both the serving apparatus and the client apparatus.

Figure 10:
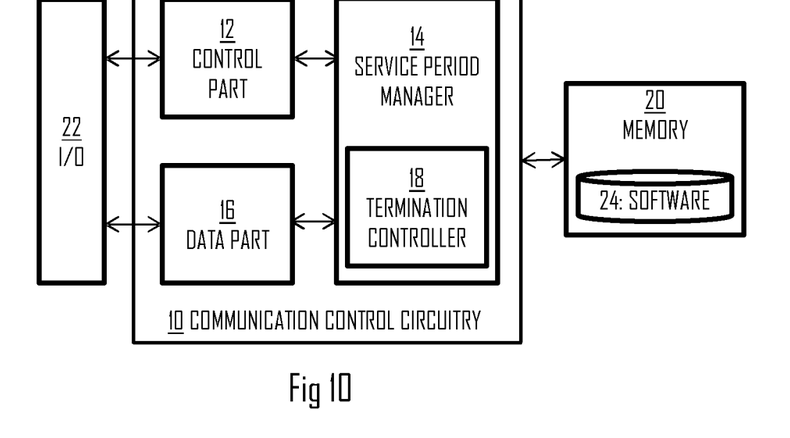
FIGS. 10 and 11 illustrate block diagrams of apparatuses according to some embodiments of the invention.

FIG. 10 illustrates an embodiment of an apparatus comprising means for carrying out the above-mentioned functionalities of the serving apparatus, e.g. the access node. The serving apparatus may be a wireless apparatus which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In another embodiment, the apparatus carrying out the above-described functionalities of the serving apparatus is comprised in such a wireless apparatus, e.g. the apparatus may comprise a circuitry, e.g. a chip, a processor, a micro controller, or a combination of such circuitries in the wireless apparatus.

Referring to FIG. 10, the apparatus may comprise a communication controller circuitry 10 configured to control wireless communications in the serving apparatus. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including the beacon messages, service period termination requests, triggering frames triggering the service period, etc. The communication controller circuitry 10 may further comprise a data part 16 that handles transmission and reception of payload data when the serving apparatus is associated to one or more other wireless apparatuses.

The communication control circuitry 10 may further comprise a service period manager 14 configured to manage service periods operated in the apparatus. The service period manager 14 may initiate a service period for wireless communication with another apparatus upon receiving a service period triggering message from the other apparatus through the control part 12. The service period manager 14 may further divide the service period into at least two time periods comprising a first time period and a second time period. Operation of a service period termination controller 18 comprised in the service period manager 14 may be configured differently depending on whether the first or the second time period is currently running. Let us assume that the apparatus itself may initiate the termination of the service period during the first time period, while the other apparatus may initiate the termination of the service period during the second time period. The termination controller 18 may discard any service period termination request received from the other apparatus through the control part 12 during the first time period without causing the termination of the service period. On the other hand, termination controller 18 may cause the termination of the service period upon receiving the service period termination request from the other apparatus through the control part 12 during the second time period. In some embodiments, the termination controller 18 may further determine the type of service period termination upon receiving the service period termination request. The termination controller may terminate the service period to the reception of the service period termination request, or it may control the control part 12 and/or data part 16 to carry out one or more frame transmissions before terminating the service period.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) 24 configuring the apparatus to perform the above-described functionalities of the serving apparatus. The memory 20 may also store communication parameters and other information needed for the wireless communications. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the serving apparatus comprises at least one processor and at least one memory including a computer program code, wherein the at least one memory and the computer program code are configured, with the at least one processor, to cause the apparatus to carry out the functionalities of the serving apparatus according to any one of the embodiments of FIGS. 2B and 3 to 9. Accordingly, the at least one processor, the memory, and the computer program code form processing means for carrying out embodiments of the present invention in the serving apparatus or, in general, a wireless apparatus.

Figure 11:
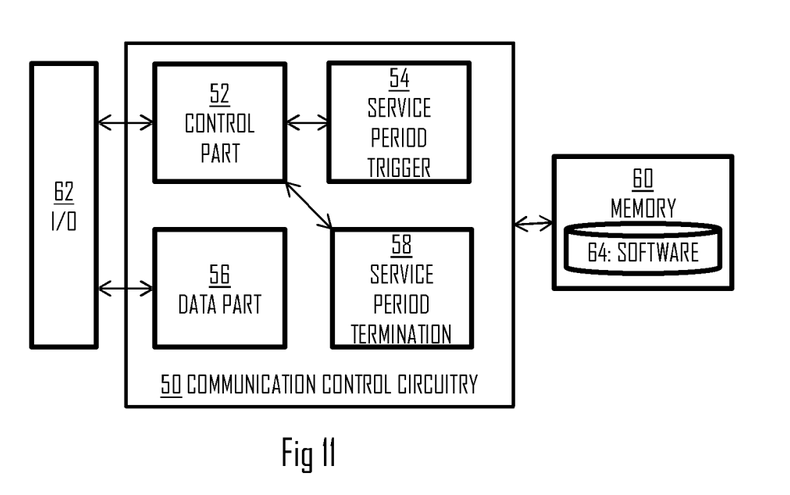

FIG. 11 illustrates an embodiment of an apparatus comprising means for carrying out the above-mentioned functionalities of the client apparatus, e.g. the terminal device. The client apparatus may comply with specifications of an IEEE 802.11 network and/or another wireless network. The client apparatus may also be a cognitive radio apparatus capable of adapting its operation to a changing radio environment, e.g. to changes in parameters of another system on the same frequency band. The client apparatus may be or may be comprised in a computer (PC), a laptop, a tablet computer, a cellular phone, a palm computer, or any other wireless apparatus provided with radio communication capability. In another embodiment, the apparatus carrying out the above-described functionalities of the client apparatus is comprised in such a wireless apparatus, e.g. the apparatus may comprise a circuitry, e.g. a chip, a processor, a micro controller, or a combination of such circuitries in the wireless apparatus.

Referring to FIG. 11, the apparatus may comprise a communication controller circuitry 50 configured to control wireless communications in the client apparatus. The communication controller circuitry 50 may comprise a control part 52 handling control signalling communication with respect to transmission, reception, and extraction of control or management frames including the service period termination requests and triggering frames triggering the service period, as described above. The control part 52 may further carry out scanning in order to detect any broadcast, beacon, or other frames carrying the above-described traffic indication map. As a consequence, the communication control circuitry 50 acquires knowledge whether or not there is data buffered for transmission to the apparatus in a serving apparatus. The communication controller circuitry 50 may further comprise a data part 56 that handles transmission and reception of payload data with other wireless apparatuses associated to the apparatus, e.g. the serving apparatuses.

The communication controller circuitry 50 may further comprise a service period triggering circuitry 54 configured to initiate a service period upon detecting that the serving apparatus has data buffered for transmission to the apparatus. The service period triggering circuitry 54 may then cause the control part 52 to transmit the above-described triggering frame to the serving apparatus and, thus, trigger the start of the service period. Data frames may then be transmitted and/or received between the apparatus and the serving apparatus during the triggered service period.

The communication control circuitry 50 may be configured to determine, during the service period or before start of the next service period whether or not advanced termination of the service period is needed. The communication control circuitry 50 may consider whether or not there exist pending tasks it needs to carry out, e.g. whether or not there is a need to scan for other serving apparatuses for handover purposes etc. If the communication control circuitry 50 determines that the advanced service period termination is necessary, the communication control circuitry 50 may activate a service period termination circuitry 58 configured to carry out the advanced service period termination according to determined rules. The service period termination circuitry 58 may check whether or not the service period is currently running. If the service period is not currently running, the service period termination circuitry 58 may cause the control part 52 to transmit the service period termination request to the serving apparatus and, thus, cancel the upcoming service period beforehand. If the service period is currently running, the service period termination circuitry may determine whether or not client apparatus is currently able to terminate the service period. This may comprise determining which one of the above-described time periods is currently running. If the running time period is the one when the client apparatus may initiate the termination of the service period, the service period termination circuitry 58 may cause the control part 52 to transmit the service period termination request. On the other hand, if running time period is the one when the client apparatus may not initiate the termination of the service period, the service period termination circuitry 58 may stand by to wait for the time period when it may initiate the termination of the service period.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise the memory 60 that stores computer programs (software) 64 configuring the apparatus to perform the above-described functionalities of the wireless apparatus, e.g. the client apparatus. The memory 60 may also store communication parameters and other information needed for the wireless communications within a wireless network of the client apparatus. The apparatus may further comprise an input/output circuitry 62. The input/output circuitry 62 may comprise radio interface components providing the apparatus with radio communication capabilities within its wireless network and/or with other wireless networks. The radio interface components may comprise standard well-known components such as an amplifier, filter, frequency-converter, (de)modulator, and encoder/decoder circuitries and one or more antennas. The apparatus may further comprise a user interface enabling interaction with the user of the device. The user interface may comprise a display, a keypad or a keyboard, a loudspeaker, etc.

In an embodiment, the apparatus carrying out the embodiments of the invention in the client apparatus comprises at least one processor and at least one memory including a computer program code, wherein the at least one memory and the computer program code are configured, with the at least one processor, to cause the apparatus to carry out the functionalities of the client apparatus according to any one of the processes described above with respect to FIGS. 2A and 3 to 9. Accordingly, the at least one processor, the memory, and the computer program code form processing means for carrying out embodiments of the present invention in the client apparatus.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2A to 9 may also be carried out in the form of a computer process defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless communication systems defined above but also to other suitable communication systems. The protocols used, the specifications of the systems, their network elements and terminal devices, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
 detecting, in a first apparatus, a start of a service period between the first apparatus and a second apparatus;
 detecting, in the first apparatus, a first period within the service period, wherein only the second apparatus is allowed to terminate the service period during the first period; and
 causing, by the first apparatus, transmission of a service period termination request to the second apparatus during a time period excluding said first period.

2. The method of claim 1, further comprising:
 causing the transmission of the service period termination request during the service period excluding the first period.

3. The method of claim 2, further comprising:
 causing the transmission of the service period termination request before the service period to terminate the service period before the service period begins.

4. The method of claim 1, further comprising: preventing transmission of the service period termination request during the first period.

5. The method of claim 1, further comprising:
 inserting, by the first apparatus, the service period termination request into at least one of the following frames transmitted to the second apparatus: an acknowledgment frame, a data frame, and/or a null frame.

6. The method of claim 1, wherein both the first apparatus and the second apparatus are enabled to terminate the service period during the time period excluding said first period.

7. A method comprising:
detecting, in a first apparatus, a start of a service period between the first apparatus and a second apparatus;
detecting, in the first apparatus, a first period within the service period, wherein only the first apparatus is allowed to terminate the service period during the first period; and
upon receiving a service period termination request from the second apparatus during the first period within the service period, preventing, by the first apparatus and at least during the first period, service period termination responsive to the service period termination request.

8. The method of claim 7, further comprising:
receiving a service period termination request from the second apparatus during the service period excluding said first period; and
in response to the reception of the service period termination request during the service period excluding said first period, causing termination of the service period by the first apparatus.

9. The method of claim 7, further comprising: upon receiving, in the first apparatus, the service period termination request from the second apparatus during the first period within the service period, discarding the service period termination request and performing no service period termination responsive to the service period termination request.

10. The method of claim 7, further comprising: upon receiving, in the first apparatus, the service period termination request from the second apparatus during the service period excluding the first period, causing the service period termination responsive to the service period termination request.

11. The method of claim 7 further comprising:
receiving the service period termination request in at least one of the following frames: an acknowledgment frame, a data frame, and/or a null frame.

12. An apparatus comprising:
at least one processor; and
at least one memory including a computer program code, wherein the at least one memory and the computer program code are configured, with the at least one processor, to cause the apparatus to at least:
detect a start of a service period between the apparatus and another apparatus;
detect a first period within the service period, wherein only the other apparatus is allowed to terminate the service period during the first period;
cause transmission of a service period termination request to the other apparatus during a time period excluding said first period.

13. The apparatus of claim 12, wherein the apparatus is further configured to at least cause the transmission of the service period termination request during the service period excluding the first period.

14. The apparatus of claim 12, wherein the apparatus is further configured to at least prevent transmission of the service period termination request during the first period.

15. The apparatus of claim 12, wherein the the apparatus is further configured to at least insert the service period termination request into at least one of the following frames transmitted to the other apparatus: an acknowledgment frame, a data frame, and/or a null frame.

16. The apparatus of claim 12, wherein both the apparatus and the other apparatus are allowed to terminate the service period during the time period excluding said first period.

17. An apparatus comprising:
at least one processor; and
at least one memory including a computer program code, wherein the at least one memory and the computer program code are configured, with the at least one processor, to cause the apparatus to:
detect a start of a service period between the apparatus and another apparatus;
detect a first period within the service period, wherein only the apparatus is allowed to terminate the service period during the first period; and
upon receiving a service period termination request from the other apparatus during the first period within the service period, prevent service period termination responsive to the service period termination request at least during the first period.

18. The apparatus of claim 17, wherein the apparatus is further configured to at least:
receive a service period termination request from the other apparatus during the service period excluding the first period; and
in response to the reception of the service period termination request during the service period excluding the first period, cause termination of the service period.

19. The apparatus of claim 17, wherein the apparatus is further configured to at least discard a service period termination request received from the other apparatus during the first period within the service period and perform no service period termination responsive to the service period termination request.

20. The apparatus of claim 17, wherein the apparatus is further configured to at least cause the service period termination responsive to the service period termination request upon receiving the service period termination request from the second apparatus during the service period excluding the first period.

21. The apparatus of claim 17, wherein the service period termination request comprises a first termination request that requests termination of the service period to transmission of a data frame subsequent to the transmission of the first termination request, and wherein apparatus is further configured to at least:
upon receiving the first termination request, cause transmission of at least one data frame to the other apparatus and terminate the service period to the transmission of the at least one data frame.

22. A non-transitory computer-readable storage medium including computer program code which when executed by at least one processor causes operations comprising:
detecting a start of a service period between a first apparatus and a second apparatus code for detecting a first period within the service period, wherein only the second apparatus is allowed to terminate the service period during the first period; and
causing transmission of a service period termination request to the second apparatus during a time period excluding said first period.

23. A method comprising:
detecting, in a first apparatus, a start of a service period between the first apparatus and a second apparatus;
detecting, in the first apparatus, a first period within the service period, wherein only the second apparatus is allowed to terminate the service period during the first period; and causing, by the first apparatus, transmission of a service period termination request to the second apparatus during a time period that is within the service period and is outside of the first period.

* * * * *